(12) United States Patent  (10) Patent No.: US 7,695,224 B2
Gleason  (45) Date of Patent: Apr. 13, 2010

(54) DEBURRING WELDED PIPE

(75) Inventor: Patrick J. Gleason, Attica, MI (US)

(73) Assignee: Lumco Manufacturing Company, Lum, MI (US)

( * ) Notice: Subject to any disclaimer, the term of this patent is extended or adjusted under 35 U.S.C. 154(b) by 71 days.

(21) Appl. No.: 12/023,800

(22) Filed: Jan. 31, 2008

(65) Prior Publication Data

US 2009/0196704 A1  Aug. 6, 2009

(51) Int. Cl.
B23D 1/24  (2006.01)
(52) U.S. Cl. .................. 409/299; 409/295; 409/346
(58) Field of Classification Search ......... 409/297–299, 409/345, 346, 293, 295; B23D 1/24, 1/00, B23D 1/02, 1/04
See application file for complete search history.

(56) References Cited

U.S. PATENT DOCUMENTS

| | | | |
|---|---|---|---|
| 2,893,292 A | | 7/1959 | Naperola |
| 2,923,208 A | * | 2/1960 | Hotchkiss et al. ............ 409/299 |
| 3,352,208 A | * | 11/1967 | Thomas et al. .............. 409/299 |
| 3,395,614 A | | 8/1968 | Dodson |
| 3,759,140 A | * | 9/1973 | Connelly ................... 409/299 |
| 3,911,710 A | | 10/1975 | Gest |
| RE28,896 E | | 7/1976 | Gleason |
| 4,138,925 A | | 2/1979 | Schulte |
| 4,358,231 A | | 11/1982 | Meier |
| 4,440,533 A | * | 4/1984 | Gotting et al. .............. 409/299 |
| 4,622,729 A | | 11/1986 | Dempsey et al. |
| 4,710,078 A | | 12/1987 | Altmeyer et al. |
| 4,752,994 A | | 6/1988 | Brunken et al. |
| 5,056,972 A | | 10/1991 | Burwell et al. |
| 5,192,013 A | | 3/1993 | Abbey, III et al. |
| 5,216,792 A | * | 6/1993 | Engler et al. ................. 29/33 T |
| 5,368,218 A | | 11/1994 | Omura |
| 5,968,380 A | | 10/1999 | Hayashi et al. |
| 6,158,646 A | | 12/2000 | Calvo, Sr. et al. |
| 6,887,020 B2 | | 5/2005 | Winkels et al. |
| 2007/0023480 A1 | | 2/2007 | Chezzi et al. |

FOREIGN PATENT DOCUMENTS

| | | | |
|---|---|---|---|
| DE | 4218363 | | 12/1993 |
| EP | 1238736 | | 9/2002 |
| JP | 56157913 A | * | 12/1981 |
| JP | 59146711 A | * | 8/1984 |
| JP | 60085819 A | * | 5/1985 |

(Continued)

*Primary Examiner*—Daniel W Howell
(74) *Attorney, Agent, or Firm*—Reising Ethington P.C.

(57) ABSTRACT

Methods of producing a pipe include curling a skelp into a cylindrical shape by bringing laterally opposed edges of the skelp together to form a seam, butt welding the seam to define the pipe downstream of the skelp, thereby leaving a radially inwardly extending weld bead. The weld bead is deburred off the pipe according to a depth of cut of a cutting tool. The depth of cut may be adjusted during deburring, and/or rotation of the cutting tool may be adjusted during deburring. The methods may be carried out using one or both of an adjustment device carried by a housing to pivot an adjustment member for adjustment of an upstream guide to adjust a depth of cut of the cutting tool into the weld bead, or an adjustment device carried by the housing and coupled to the cutting tool to rotate the cutting tool during deburring.

15 Claims, 8 Drawing Sheets

FOREIGN PATENT DOCUMENTS

| | | | | |
|---|---|---|---|---|
| JP | 61192409 | A * | 8/1986 |
| JP | 62277213 | | 12/1987 |
| JP | 02131811 | A * | 5/1990 |
| JP | 02298416 | A * | 12/1990 |
| JP | 05253732 | A * | 10/1993 |
| JP | 06134613 | A * | 5/1994 |
| JP | 09103910 | A * | 4/1997 |
| JP | 10337609 | A * | 12/1998 |
| JP | 11033814 | A * | 2/1999 |
| JP | 2002028720 | A * | 1/2002 |

* cited by examiner

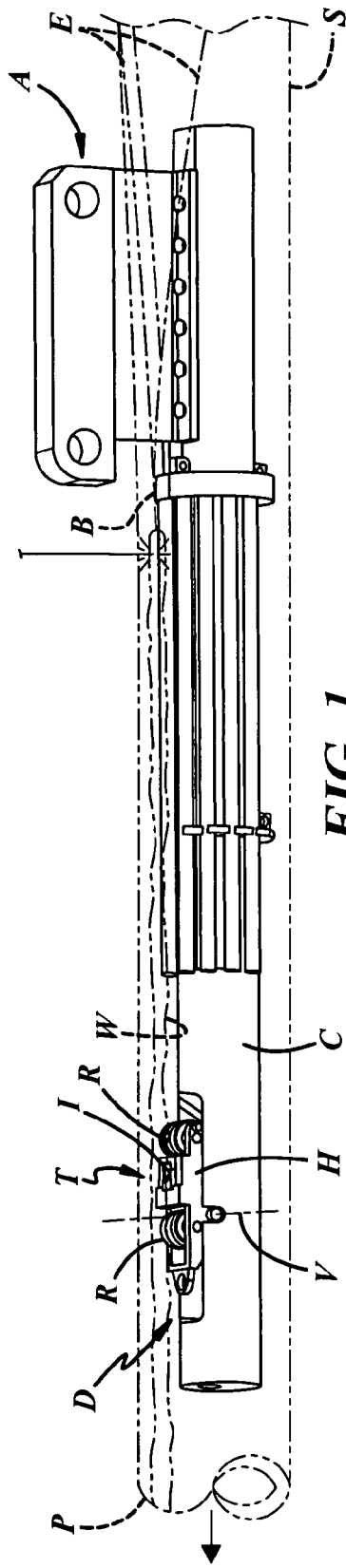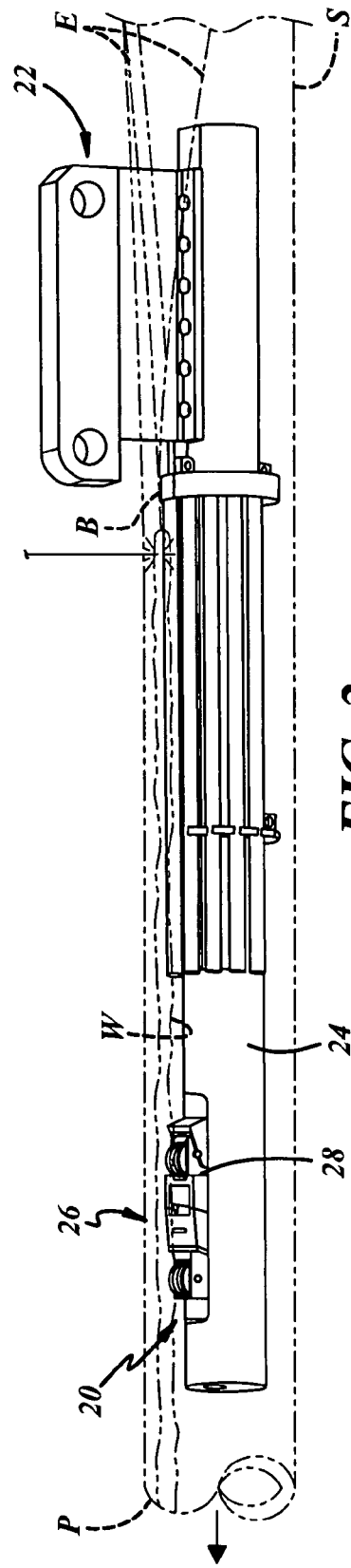
FIG. 1 (PRIOR ART)
FIG. 2

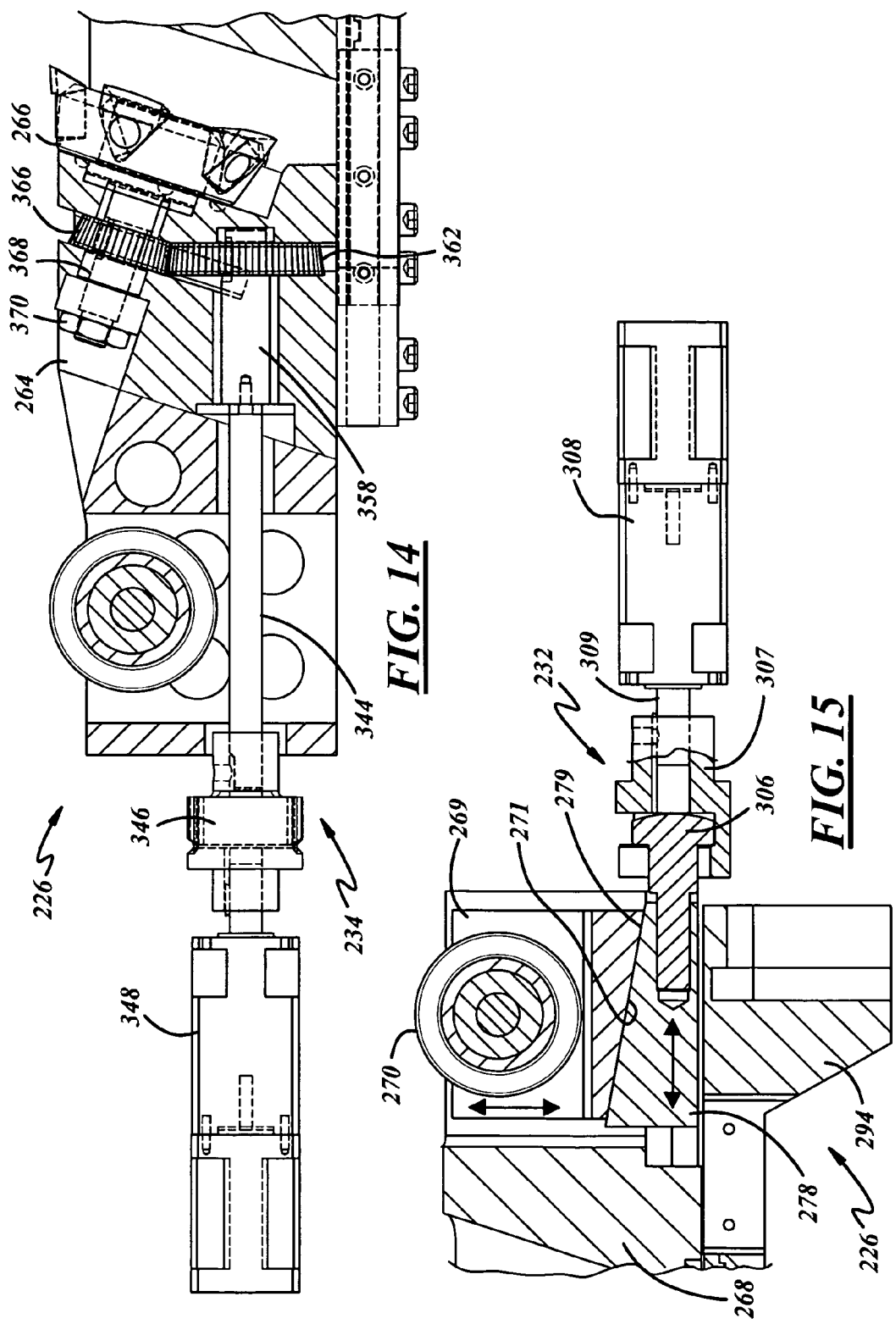

DEBURRING WELDED PIPE

FIELD OF THE INVENTION

The present invention relates generally to material removal processes such as planing, and more particularly to deburring a weld bead from an internal surface of a pipe.

BACKGROUND OF THE INVENTION

Various types of pipe may be manufactured according to many different processes. For example, oil field pipe of three to four feet in diameter and 80 to 100 feet in length is frequently welded from sheet stock in a longitudinally continuous manner according to several simultaneous steps. For instance, as illustrated in prior art FIG. 1, a strip of metal or skelp S is unrolled from a coil of sheet metal (not shown). The skelp S is curled into a cylindrical shape by bringing laterally opposed edges E of the skelp S together to form a seam B. The seam B is butt welded, thereby leaving a radially inwardly extending weld bead W. The weld bead W is removed with a deburring apparatus D that remains stationary as a freshly formed pipe P is fed downstream over the deburring apparatus D.

The deburring apparatus D includes a support arm A suspended from a welding machine (not shown), a cylinder C carried by the support arm A projecting into an upstream end of the freshly formed pipe P, and deburring tooling T pivotably carried at a downstream end of the cylinder. The deburring tooling T usually includes a housing H pivotably mounted to the cylinder C, and rollers R rotatably carried by the housing H to engage an internal surface of the freshly formed pipe P and are grooved to straddle the weld bead W to set the depth of the tooling T. The deburring tooling T also includes a cutting insert I carried by the housing H between the rollers R for cutting the weld bead W off the pipe P. The housing H pivots about a pivot axis V, which is disposed between the rollers R and downstream of the cutting insert I. The housing H passively floats in a pivotable manner, but is not actively adjusted. The depth of cut may be adjusted according to a plane established between the two rollers R and the tooling T. The front roller R may be moved to shift the angle of the plane.

But conventional deburring devices typically are not adjustable for "in-process" cutter changes and/or depth of cut changes, during the pipe manufacturing operation and, at the very least, are not adjustable over a plurality of incremental or infinitely variable adjustment positions. Moreover, the inside of the pipe is a very high temperature environment and conventional deburring devices do not provide a robust method of adjusting cutters or depth of cut on an in-process basis.

SUMMARY OF THE INVENTION

A tool for deburring an internal weld bead from a welded pipe according to one implementation includes a housing, a cutter and guide assembly carried by the housing and including a body, a cutting tool carried by the body, an upstream guide rotatably carried by the body, an adjustment member carried by the body to adjust the upstream guide, and a downstream guide rotatably carried by the body. The apparatus may include one or both of the following adjustment devices. An adjustment device may be carried by the housing to move the adjustment member for adjustment of the upstream guide to adjust a depth of cut of the cutting tool into the weld bead over a plurality of depths of cut between minimum and maximum depths of cut. Another adjustment device may be carried by the housing downstream of the downstream guide body and coupled to the cutting tool to rotate the cutting tool.

A method of producing a pipe, which is curled from a skelp into a cylindrical shape by bringing laterally opposed edges of the skelp together to form a seam, which is butt welded to define the pipe downstream of the skelp, thereby leaving a radially inwardly extending weld bead. According to the method the weld bead is deburred off the pipe according to a depth of cut of a cutting tool. The method also includes one or both of the following steps of adjusting the depth of cut and/or adjusting rotation of the cutting tool during deburring.

At least some of the objects, features and advantages that may be achieved by at least certain embodiments of the invention include providing a welded pipe manufacturing method and related tooling that enables: adjustment of cutter rotation or a depth of cut on an in-process basis; adjustment of rotation of a cutter holder to maximize use of a cutting tool insert from one side of the insert to another; wherein the tooling is of relatively simple design, economical manufacture and assembly, rugged, durable, reliable, and in service has a long useful life.

Of course, other objects, features and advantages will be apparent in view of this disclosure to those skilled in the art. Various other methods and tooling embodying the invention may achieve more or less than the noted objects, features or advantages.

BRIEF DESCRIPTION OF THE DRAWINGS

These and other objects, features and advantages of the present invention will be apparent from the following detailed description of preferred embodiments and best mode, appended claims, and accompanying drawings in which:

FIG. 1 is a fragmentary and partial perspective view of a prior art pipe manufacturing arrangement;

FIG. 2 is a fragmentary and partial perspective view of an exemplary pipe manufacturing arrangement;

FIGS. 14 and 15 illustrate a fragmentary longitudinal cross-sectional view of the deburring apparatus of FIG. 13 taken along line 14-14 thereof.

DETAILED DESCRIPTION OF PREFERRED EMBODIMENTS

Referring in more detail to the drawings, FIG. 2 illustrates a pipe manufacturing arrangement in which a strip of metal or skelp S is unrolled from a coil of sheet metal (not shown), the skelp S is curled into a cylindrical shape by bringing laterally opposed edges E of the skelp S together to form a seam B, and the seam B is butt welded, thereby leaving a radially inwardly extending weld bead W. The weld bead W is removed with a deburring apparatus 20 as a freshly formed pipe P is fed downstream over the deburring apparatus 20.

The deburring apparatus 20 removes or deburrs the weld bead W from an internal surface of the welded pipe P. The deburring apparatus 20 may include a support arm 22 suspended from a welding machine (not shown), a cylinder 24 carried by the support arm 22 and projecting into an upstream end of the pipe P, and deburring tooling 26 carried at a downstream end of the cylinder 24.

Figure 3:
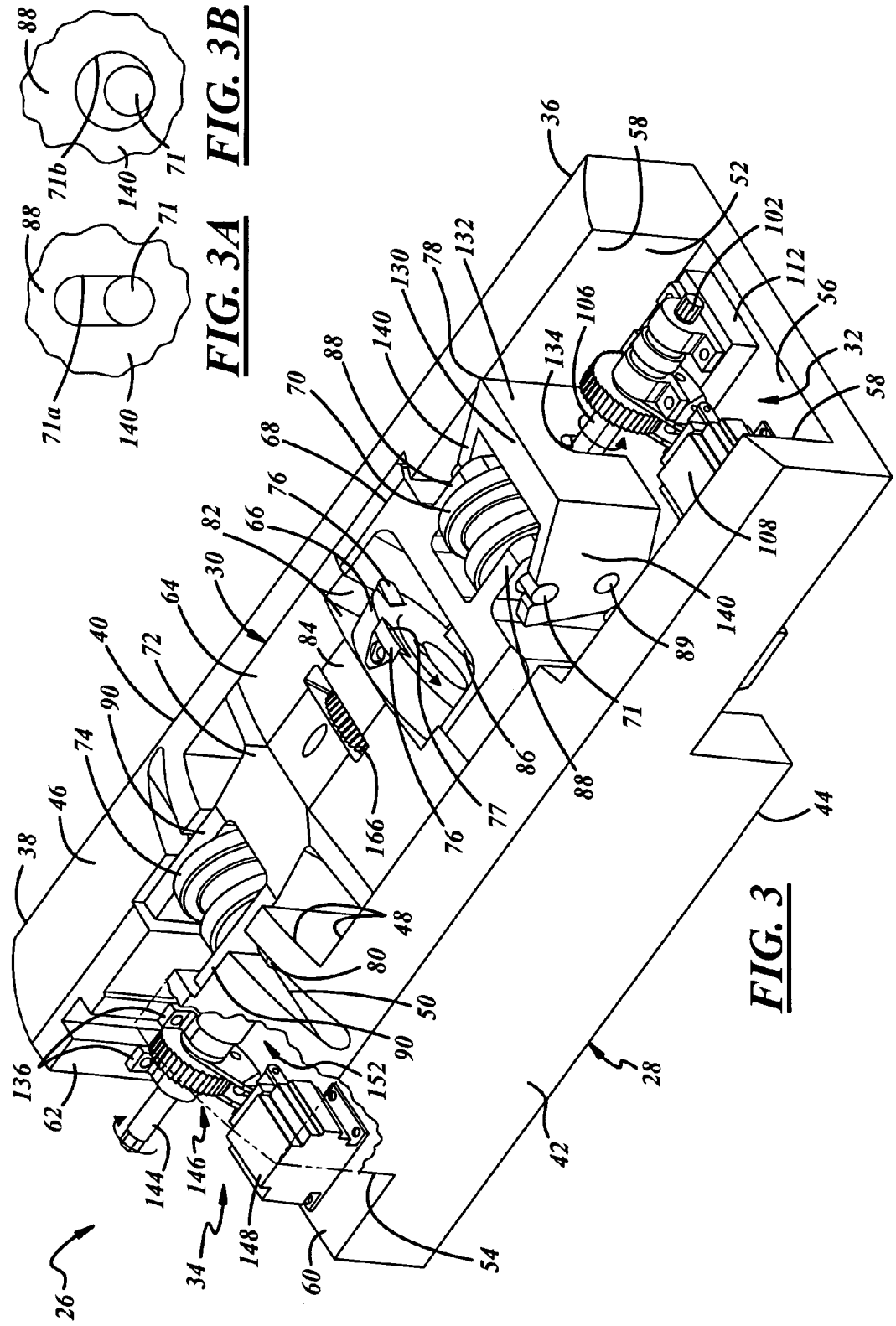
FIG. 3 is a partially fragmented perspective view of exemplary weld bead deburring tooling for use with the pipe manufacturing arrangement of FIG. 2.

Referring to FIG. 3, the deburring tooling 26 generally includes a frame or housing 28 that may be an integral portion of, or separately carried by, the longitudinally extending cylinder 24. In any case, the housing 28 carries a cutter and guide assembly 30, and a guide adjustment device 32 and a cutter indexer or adjustment device 34 for adjusting corresponding portions of the cutter and guide assembly 30, as will be described in detail below.

The housing 28 includes an upstream end 36, a downstream end 38, sides 40, 42, a bottom 44, a rounded top 46, and an opening 48 between the top 46 and bottom 44 to accept the cutter and guide assembly 30 at least partially therein. The housing 28 also includes an open groove 50 transversely oriented in the top 46, an upstream pocket 52 carrying the guide adjustment device 32 at the upstream end 36, and a downstream pocket 54 carrying the cutter adjustment device 34 at the downstream end 38. The upstream pocket 52 includes an upstream base surface 56 and sidewalls 58 extending therefrom. The downstream pocket 54 includes a downstream base surface 60 and at least one side wall 62 adjacent thereto.

The cutter and guide assembly 30 generally includes a body, which may include a cutter body 64, an upstream guide body 68 carrying an upstream guide 70 and being coupled to the cutter body 64 in any suitable manner, and a downstream guide body 72 carrying a downstream guide 74 and being coupled to the cutter body 64 in any suitable manner. More specifically, the cutter body 64 may rotatably carry a cutting tool such as a cutter holder 66 and a plurality of cutting tool inserts 76 carried by the cutter holder 66 in any suitable fashion. The cutter holder 66 and inserts 76 are one form of a cutting tool, and any other conceivable type of cutting tool may be used. Also, the upstream guide body 68 may rotatably carry the upstream guide 70, which may be a grooved roller, and may pivotably carry an adjustment member 78 at an upstream end to adjust the roller or upstream guide 70. Additionally, the downstream guide body 72 may rotatably carry the downstream guide 74, which also may be a grooved roller, such as on an axle shaft 80 adapted to locate within the open groove 50 of the housing 28.

The guide bodies 68, 72 may be interlocked, fastened, welded, and/or coupled to the cutter body 64 in any other suitable fashion. The cutter body 64 may include a relieved portion 82 for accommodating the cutter holder 66 and a top surface 84 nearly flush with the cutter holder 66 for good back up support for the cutting inserts 76. Similarly, the upstream guide body 68 includes a relieved portion 86 for accommodating the cutter holder 66 and to provide clearance for a removed weld bead (not shown) to be fed through the assembly 30. The upstream guide body 68 may also include spaced apart flanges 88 to accommodate the upstream guide 70 therebetween and to mount the guide 70 thereto such as via an axle shaft 71. The flanges 88 may also pivotably carry the adjustment member 78 via one or more pivot shafts 89 extending therethrough. Similarly, the downstream guide body 72 may include spaced apart flanges 90 to accommodate the downstream guide 74 therebetween and to provide mounting structure therefore wherein the axle shaft 80 extends through the flanges 90 and guide 74.

Figure 5:
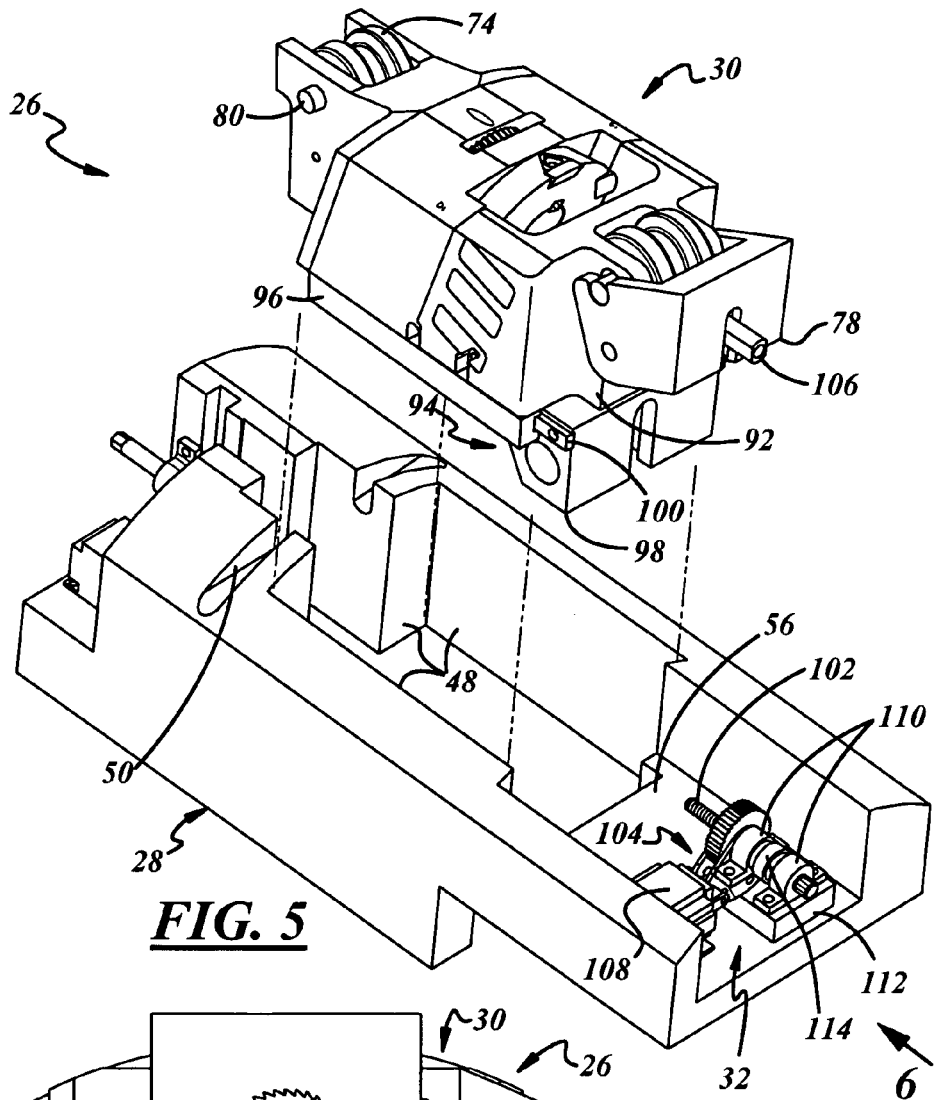
FIG. 5 is an exploded perspective view of the deburring apparatus of FIG. 3.
Figure 6:
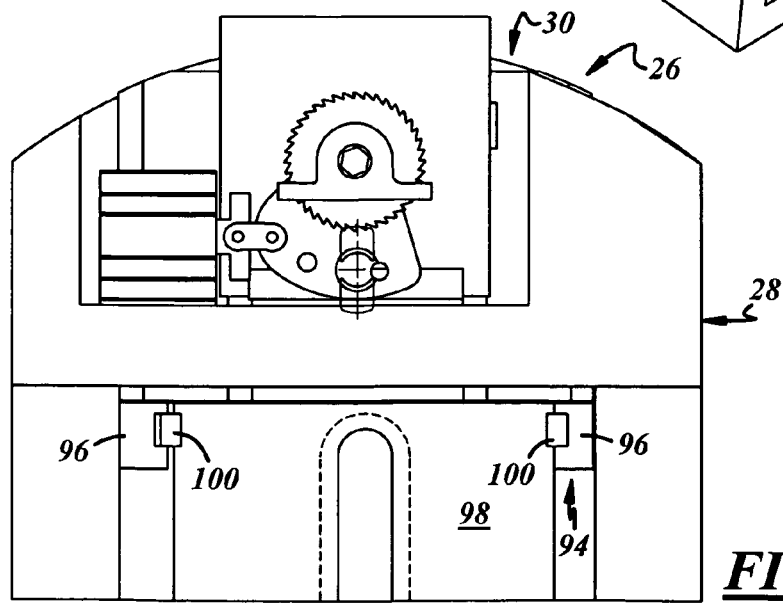
FIG. 6 is an end view of the deburring apparatus of FIG. 3, taken along arrow 6 of FIG. 5.

As best shown in FIG. 5, the cutter and guide assembly 30 is carried by the housing 28 substantially within the opening 48 thereof, wherein the axle shaft 80 of the downstream guide 74 locates within the open groove 50 of the housing 28, and an upstream end 92 of the upstream guide body locates against a downstream portion of the base surface 56 of the upstream pocket 52. Referring also to FIG. 6, the cutter and guide assembly 30 also may be coupled to the housing 28 along with a scrap chopper 94.

The scrap chopper 94 may include one or more cutting surfaces or tools (not shown) to cut or chop the long and stringy sheared weld bead into more manageable shorter sections. The scrap chopper 94 may include guide rails 96, which may be fixed to the bottoms of the cutter and guide bodies 64, 68, 72 (FIG. 5) in any suitable manner. The scrap chopper 94 may also include a chopper body 98 having an upstream end with an open slot that may be coupled to an actuator (not shown) to longitudinally reciprocate the body 98 to cut the stringy weld bead. The open slot is open to allow the assembly 30 to be easily lifted out of the housing 28 as shown in FIG. 5. Finally, the scrap chopper 94 may include guide rails 100, which may be fixed to the chopper body 98 in any suitable manner and may be movably coupled to the guide rails 96.

Referring to FIG. 5, the guide adjustment device 32 is carried within the upstream pocket 52 of the housing 28 on the base surface 56. The guide adjustment device 32 may include an incremental adjustment device of any suitable type. For example, the guide adjustment device 32 may include a threaded shaft 102, a ratchet mechanism 104 coupled to the threaded shaft 102, a threaded yoke 106 coupled to the threaded shaft 102 and to the adjustment member 78, an actuator 108 to drive the ratchet mechanism 104, pillow blocks 110 carried on a riser 112 to rotatably support the threaded shaft 102, and a thrust bearing 114 between the pillow blocks 110 to axially support the threaded shaft 102. The actuator 108 may be any suitable device for actuating the ratchet mechanism 104, such as a servo, solenoid, or the like.

As will be described below, the threaded shaft 102 may instead be coupled directly to a servo motor or stepping motor. This method would allow the threaded shaft 102 to be rotated in either a clockwise direction or a counterclockwise direction thus allowing adjustment in either direction.

The actuator 108 may be supplied with power and control signals in any suitable manner. For example, the housing 28 and/or cylinder 24 supporting the housing may carry any suitable power supply (not shown) such as one or more batteries, capacitors, or the like. Such an on-board power supply may be suitably coupled to the actuator 108 in any desired manner. The actuator 108 may be a wireless device such as a radio frequency servo motor, or the like that may be controlled wirelessly and remotely in any suitable manner. In another example, the actuator 108 may be a solenoid or the like that is coupled with power and/or control wiring that may be carried by the housing 28 and the cylinder 24 and coupled to any suitable controller. Accordingly, the actuator 108 may be controlled in conjunction with, or independently of, the pipe or tube welding operations to change a tooling cutting edge and/or a tooling depth of cut.

Figure 7:
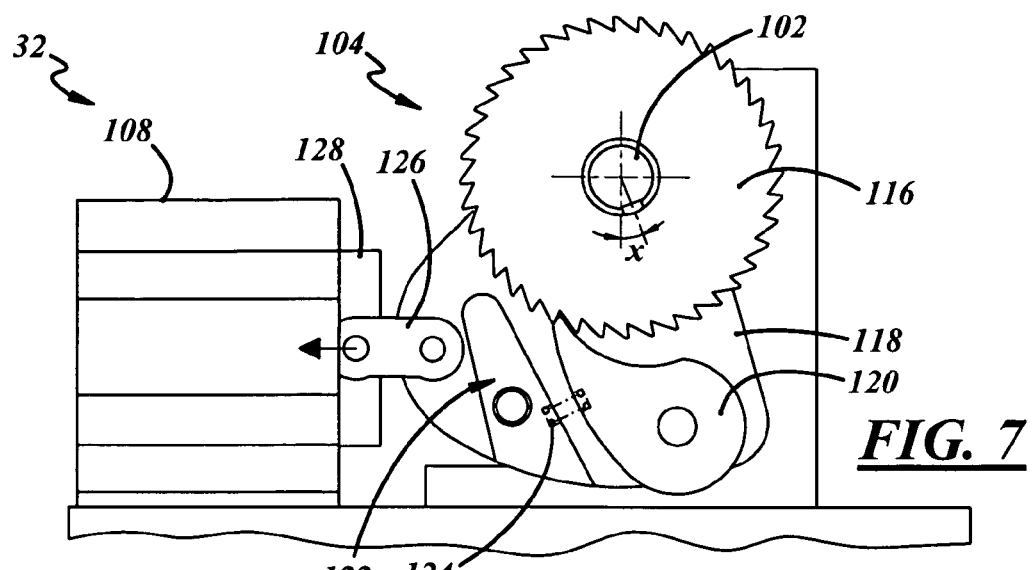
FIGS. 7 through 9 illustrate an adjustment device of the deburring apparatus of FIG. 3 in various positions.
Figure 8:
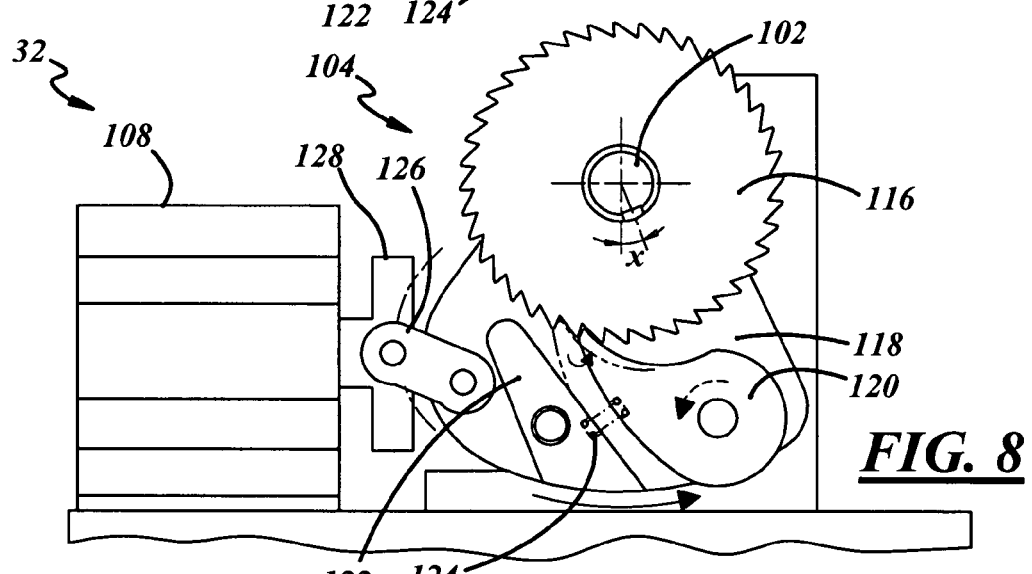
Figure 9:
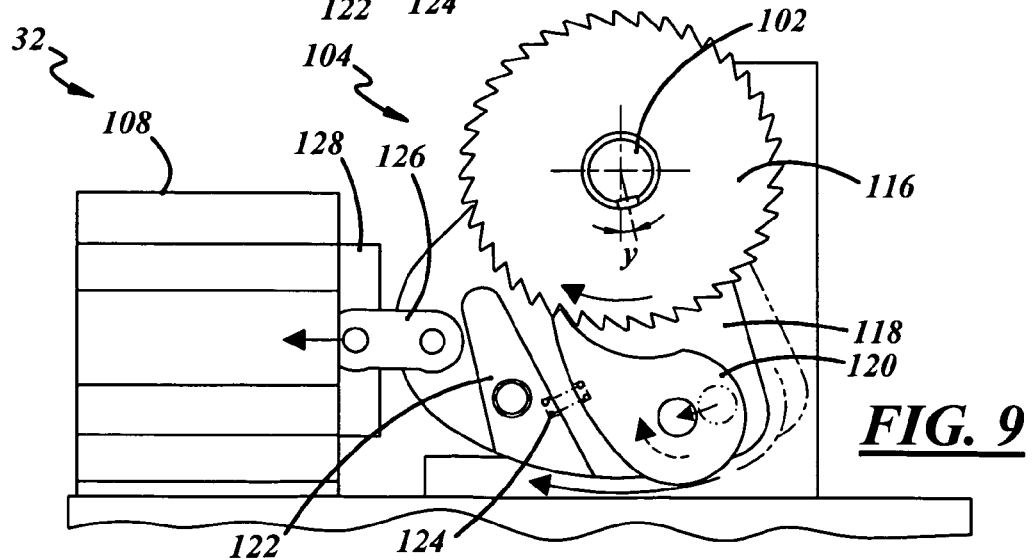

Referring to FIGS. 7 through 9, the ratchet mechanism 104 may include a portion of the threaded shaft 102 and a toothed wheel 116 rotatably fixed to the threaded shaft 102 in any suitable manner. The ratchet mechanism 104 also may include actuator arms 118 (one shown) pivotably carried on the threaded shaft 102 in any suitable manner on either side of the toothed wheel 116, and a pawl 120 pivotably carried by and between the actuator arms 118 in any suitable manner. The ratchet mechanism 104 further may include a reaction member 122 fixed between the actuator arms 118 in any suitable manner, and a spring 124 to urge the pawl 120 into detent with the toothed wheel 116. Finally, a link 126 may couple the actuator arms 118 to an armature 128 of the actuator 108.

As shown in FIG. 7, the armature 128 is in a home position, the ratchet mechanism 104 has been pulled to the left and, thus, the toothed wheel 116 has been rotated clockwise at a relative angle x. As shown in FIG. 8, the actuator 108 has been deactivated to allow the armature 128 to advance to a home position (such as under spring force) and thereby push the ratchet mechanism 104 to the right so as to pivotably retract the actuator arms 118 to pull the pawl 120 out of detent with the toothed wheel 116 against the bias force of the spring 124, and place the pawl 120 into an adjacent detent position of the toothed wheel 116. As shown in FIG. 9, the actuator 108 again has been activated to retract its armature 128, to pull the ratchet mechanism 104 to the left and thereby pivotably advance the actuator arms 118 to push the re-engaged pawl 120 so as to incrementally rotate or index the toothed wheel 118 and threaded shaft 102 a relative angle y.

Figure 10:
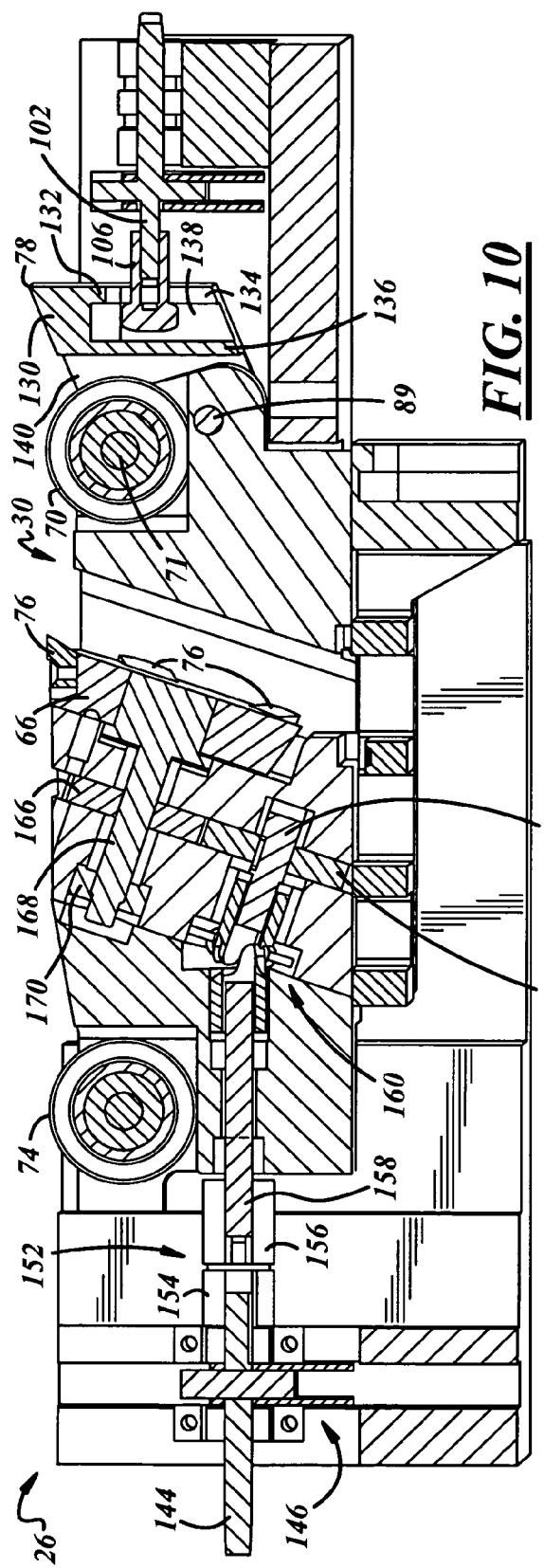
FIG. 10 is a longitudinal cross-sectional view of the deburring apparatus of FIG. 3.
Figure 11:
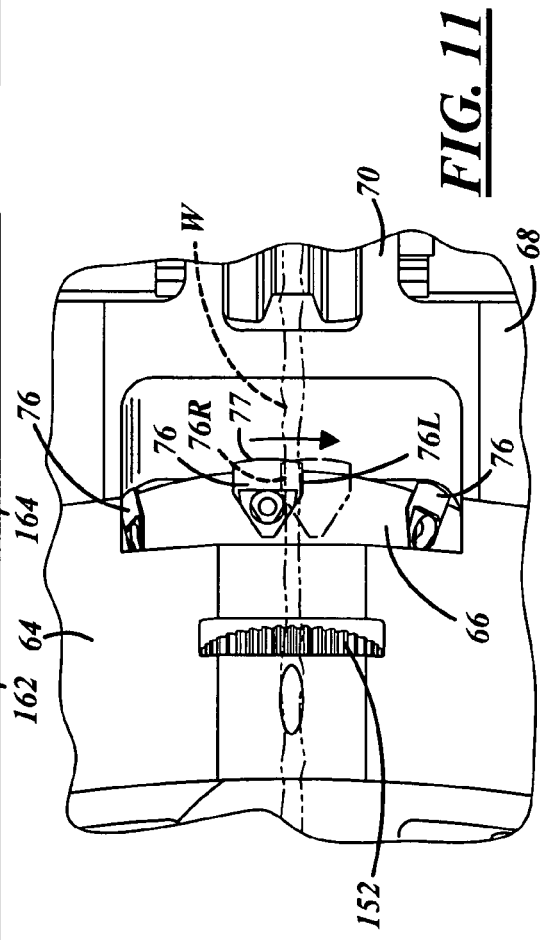
FIG. 11 is an enlarged fragmentary top view of the deburring apparatus of FIG. 3, illustrating incremental adjustment of a cutter from one side of a cutting tool insert to another side of the cutting tool insert.

Referring to FIGS. 3 and 10, rotation of the threaded shaft 102 causes the threaded yoke 106 to linearly retract. Retraction of the yoke 106 causes the yoke 106 pull on, and thereby pivot, the adjustment member 78 about its pivot shaft(s) 89. The adjustment member 78 may include a body portion 130 with an upstream wall 132 having an open slot 134 therein to accommodate a body portion of the yoke 106 and a downstream wall 136 wherein a pocket 138 is defined between the walls 132, 136 to accommodate a head portion of the yoke 106. The adjustment member 78 may also include laterally opposed flanges 140, through which the pivot shaft 89 may extend and in which notches 142 are provided to engage with the guide axle shaft 71.

The flanges 88 of the upstream guide body 68 may be provided with apertures such as slots 71A or oversized holes 71B to accommodate displacement of the axle shaft 71 therein for adjustment of the guide 70. The apertures are larger than the axle shaft 71 such that the axle shaft 71 is movable within the apertures for adjustment of the guide 70. The slots 71A may be of any suitable shape such as straight or arcuate. Accordingly the axle shaft 71 may be linearly or arcuately translatable within the slots 71A and/or holes 71B. Therefore, the guide 70 may be raised to adjust a depth of cut of the tooling inserts 76 into the weld bead over a plurality of depths of cut between minimum and maximum depths of cut. Cutter adjustment may be unidirectional such that it is set to an initial magnitude and then adjusted upward or downward from there. For example, cutter depth of cut may be initially set to a maximum depth of cut and then adjusted in the direction of decreasing depth of cut, or vice versa. In any case, the depth of cut can be adjusted or indexed in-process. More specifically, the depth of cut may be adjusted according to a plurality of relatively fine increments over a minimum to maximum depth of cut range, instead of mere two position adjustment from a minimum depth of cut to a maximum depth of cut.

Figure 4:
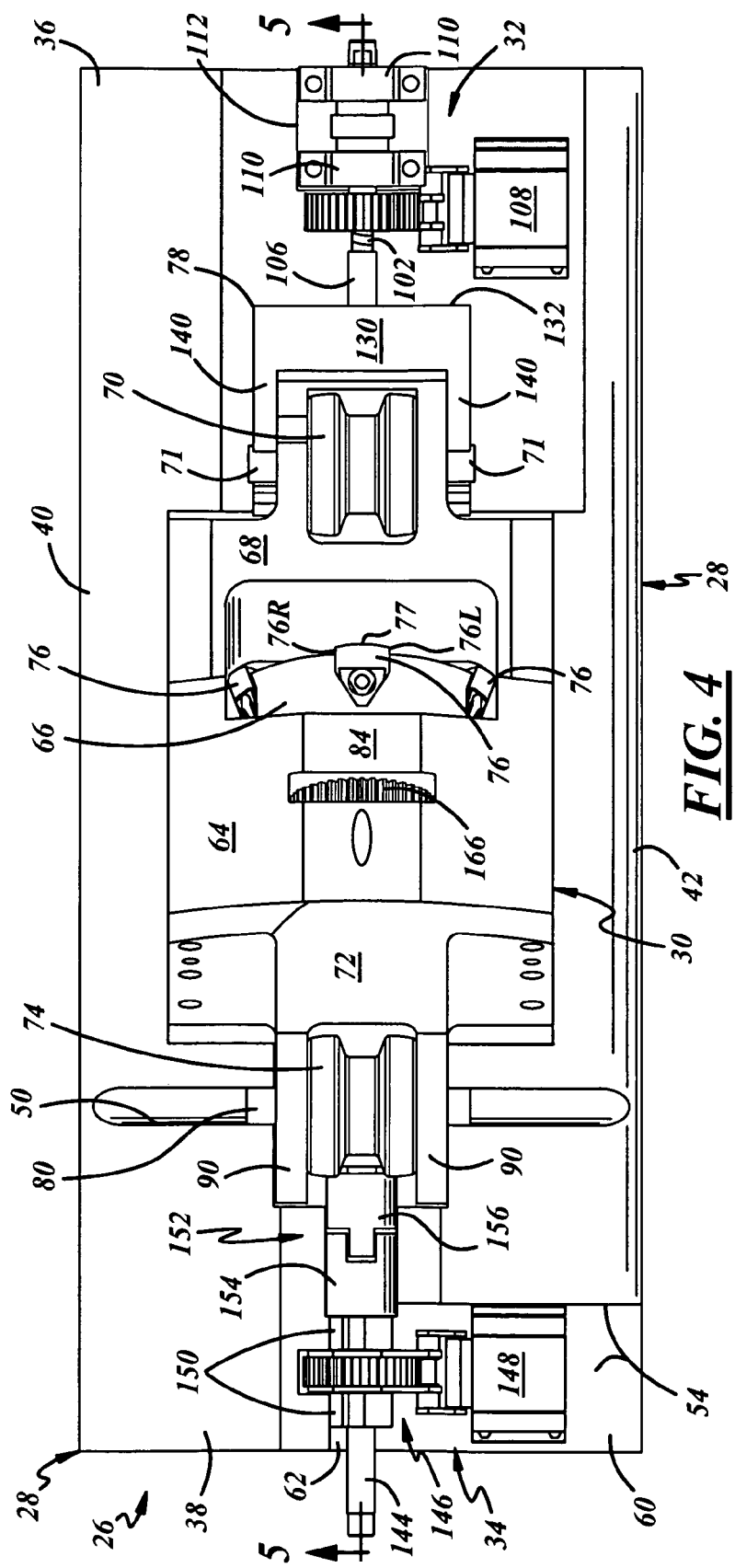
FIG. 4 is a top view of the deburring apparatus of FIG. 3.

Referring to FIGS. 3 and 4 again, the cutter adjustment device 34 may be carried within the downstream pocket 54 of the housing 28. The cutter adjustment device 34 may variably rotate the cutter head 66 in any suitable manner to present a new cutting edge to the weld bead, and may include an incremental adjustment device of any suitable type. For example, the device 34 may include a drive shaft 144, a ratchet mechanism 146 coupled to the drive shaft 144, an actuator 148 carried on the downstream pocket base surface 60 to drive the ratchet mechanism 146, and pillow blocks 150 carried on the vertical wall 62 adjacent the base surface 60 to rotatably support the drive shaft 144. The ratchet mechanism 146 may be the same or substantially similar to that described with respect to FIGS. 7 through 9. The cutter adjustment device 34 may be coupled to the cutter head 66 by a driveline, which may be coupled to the drive shaft 144 via a removable coupling 152 at one end and to the cutter head 66 at another end.

As best shown in FIG. 10, the driveline coupling 152 includes a ratchet coupling member 154, and a cutter and guide assembly coupling member 156 removably coupled to the ratchet coupling member 154 in any suitable manner. The driveline may also include a downstream guide shaft 158 coupled to the assembly coupling member 156 and extending through the downstream guide body 72, and a universal joint 160 coupled to the downstream guide shaft 158 and carried in and between the downstream guide body 72 and the cutter body 64. The universal joint 160 may be an inverted design universal joint model S57PY4-SFU0830 available from Stock Drive Products/Sterling Instruments of New Hyde Park, N.Y. The driveline may further include a drive gear 162 coupled to the universal joint 160 via a gear shaft 164, and a driven gear 166 in mesh with the drive gear 162 and coupled to the cutter holder 66 with a cutter shaft 168, which may be rotatably retained to the cutter body 64 with a nut 170 and to the cutter holder 66 with a keyway arrangement as shown or any other suitable arrangement.

Referring to FIGS. 3 and 10, activation of the actuator 148 (FIG. 3) actuates the ratchet mechanism 146 to incrementally rotate the driveline (FIG. 10), thereby incrementally rotating the cutter holder 66. Thus, the cutter holder 66 can be incrementally rotated or indexed between the multiple cutting tool inserts 76 and/or to index across a single insert. For example, the actuator 148 may be actuated to incrementally rotate the cutter holder 66, such that a single cutting insert 76 may be progressively swept across a weld bead W from one lateral side 76L of the insert 76 to an opposite lateral side 76R of the insert 76. Accordingly, maximum use may be made of each insert 76 such that substantially an entire upstream edge 77 of each insert 76 can be used for increased tooling efficiency and concomitant reduction in tooling costs.

FIGS. 12 through 15 illustrate another presently preferred form of a deburring apparatus 220. This form is similar in many respects to the form of FIGS. 1 through 11 and like numerals between the forms generally designate like or corresponding elements throughout the several views of the drawing figures. Accordingly, the descriptions of the deburring apparatuses 20 and 220 are hereby incorporated by reference in their entireties into one another. Additionally, the description of the common subject matter generally may not be repeated here.

Figure 12:
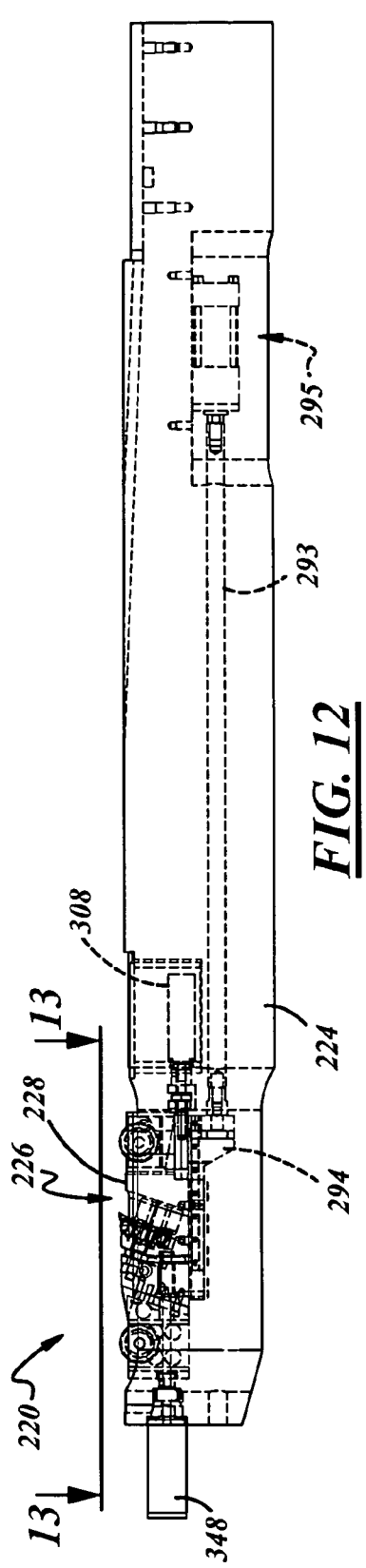
FIG. 12 is a partial view of another exemplary pipe manufacturing arrangement, including a deburring apparatus carried by a cylinder.

Referring to FIG. 12, the deburring apparatus 220 includes deburring tooling 226 that generally includes a frame or housing 228 that may be an integral portion of, or separately carried by, a longitudinally extending cylinder 224. The deburring apparatus 220 may also include actuators 308, 348 that may be carried by one or both of the housing 228 or cylinder 224. The deburring apparatus 220 may further include a scrap chopper 294, a chopper actuator 295 that may be carried by the cylinder 224 and coupled to the chopper 294 by a linkage 293 in any suitable manner. The actuators 308, 348 may include stepping motors from Lin Engineering of Santa Clara, Calif., Model 4118M-06P1017PLX, which may be attached to a miniature 161:4 gear reducer.

Figure 13:
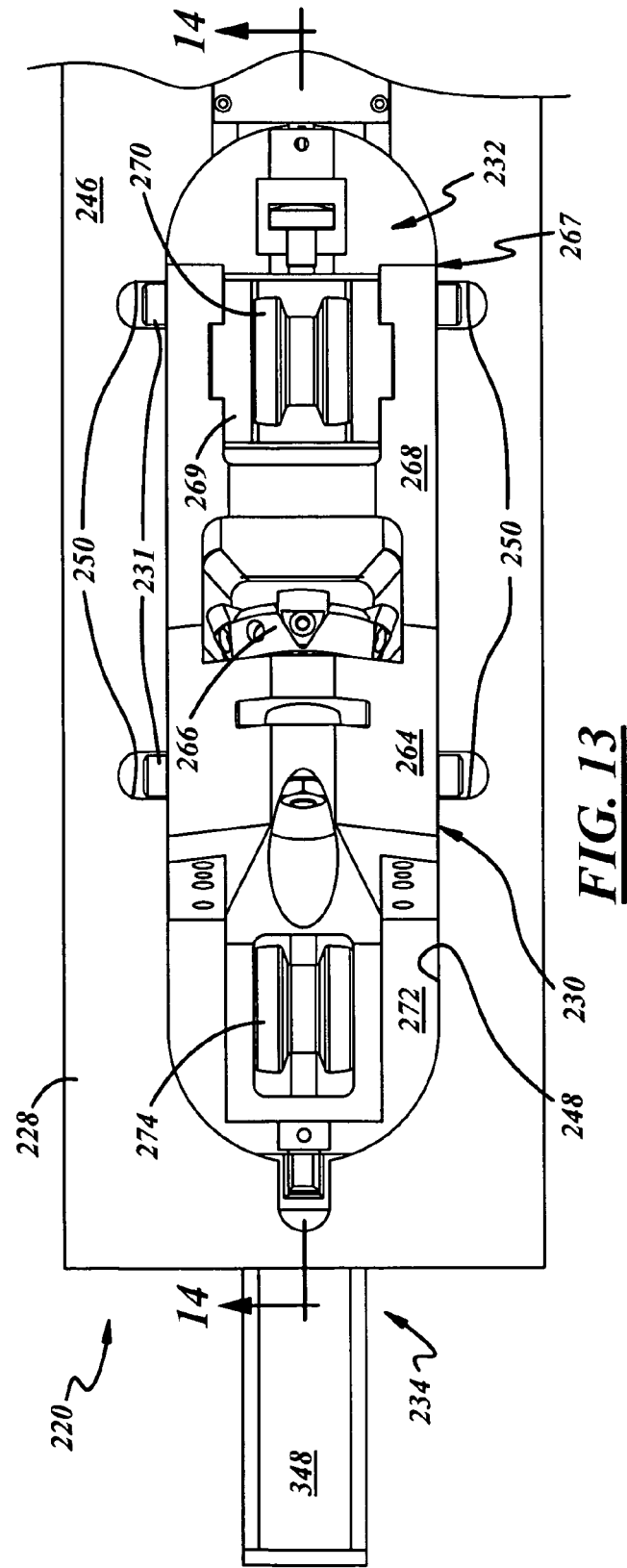
FIG. 13 is a fragmentary top view of a portion of the cylinder and deburring apparatus of FIG. 12.

Referring now to FIG. 13, the housing 228 carries a cutter and guide assembly 230, and a guide adjustment device 232 and a cutter indexer or adjustment device 234 for adjusting corresponding portions of the cutter and guide assembly 230, as will be described in detail below. The housing 228 includes an opening 248 to accept the cutter and guide assembly 230 at least partially therein, and open grooves 250 transversely oriented in a top 246.

The cutter and guide assembly 230 generally includes a body, which may include a cutter body 264 carrying a cutter holder 266, and an upstream guide housing 268 and a downstream guide body 272 carrying a downstream guide 274. The upstream guide housing 268 and the downstream guide body 272 may be coupled to the cutter body 264 in any suitable manner. The body may be coupled to the housing 228 in any suitable manner, for example, using cap screws 231 threaded into the body and carried in the open grooves 250 of the housing 228.

An upstream guide assembly 267 may include an upstream guide holder 269 carried by the upstream guide housing 268 and an upstream guide 270 rotatably carried by the upstream guide holder 269 in any suitable manner. The guide holder 269 may be translatably carried by the guide housing 268 such as by a dovetail arrangement, or tongue and groove arrangement as shown, or any other suitable configuration.

Referring to FIG. 15, the guide adjustment device 232 may include the guide holder 269 and an adjustment member 278 that cooperates with the guide holder 269 via cooperating tapered surfaces 271, 279. The guide adjustment device 232 may also include the actuator 308, which may be coupled to the adjustment member 278 in any suitable manner such as by a yoke 306 threaded to the adjustment member 278 and a special coupling 307 that may be suitably coupled to and between the yoke 306 and a shaft 309 of the actuator 308. The coupling 307 may be slotted and open at its top as shown to facilitate easy insertion and removal of the assembly 230 from the housing 228. The actuator 308 may be energized in any suitable manner to finely longitudinally translate the adjustment member 278 such that the tapered surfaces 271, 279 cooperate to transversely translate the guide holder 269 and the guide 270 to adjust a depth of cut, such as in an infinitely variable or continuous manner. Also, the actuator 308 may be energized during weld bead deburring to provide in-process adjustment of the depth of cut.

Referring again to FIG. 14, the cutter adjustment device 234 may variably rotate the cutter head 266 in any suitable manner and may be a variable adjustment device of any suitable type. For example, the device 234 may include a drive shaft 344, the actuator 348, and any suitable coupling 346 coupled therebetween. The cutter adjustment device 234 may be coupled to the cutter head 266 by a driveline, which may be coupled to the drive shaft 344.

The driveline may include a downstream guide shaft 358 coupled to the drive shaft 344, a drive gear 362 coupled to the guide shaft 358, and a driven gear 366 in mesh with the drive gear 362 and coupled to the cutter holder 266 with a cutter shaft 368. The cutter shaft 368 may be rotatably retained to the cutter body 264 with a nut 370 and to the cutter holder 266 with a keyway arrangement or any other suitable arrangement. The gears 362, 366 may be bevel gears to accommodate the angular difference in axial orientation of the drive shaft 344 and the cutter holder 266. The actuator 348 may be energized in any suitable manner to finely rotate the gears 362, 366 and, thus, rotate the cutter holder 266 in an infinitely variable or continuous manner. Also, the actuator 348 may be energized during weld bead deburring to provide in-process cutter adjustment.

In general, the various components of the deburring tooling may be composed of any suitable material(s), for example, steel, aluminum, iron, or any other suitable metals, and may be constructed in any suitable manner, for example, as castings, machined components, or according to any other suitable manufacturing methods.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

What is claimed is:

1. A tooling apparatus for deburring an internal weld bead from a welded pipe, comprising:
   a housing including upstream and downstream ends, sides, a bottom, a rounded top, and an opening;
   a cutter and guide assembly carried by the housing in the opening thereof, and including:
      a body;
      a cutting tool carried by the body;
      an upstream guide rotatably carried by the body;
      an adjustment member carried by the body to adjust the upstream guide; and
      a downstream guide rotatably carried by the body; and
   an adjustment device carried by the housing to move the adjustment member for adjustment of the upstream guide to adjust a depth of cut of the cutting tool into the weld bead over a plurality of depths of cut between minimum and maximum depths of cut; and
   wherein the body includes:
      a cutter body carrying the cutting tool;
      an upstream guide body coupled to the cutter body and rotatably carrying the upstream guide and carrying the adjustment member to adjust the upstream guide; and
      a downstream guide body coupled to the cutter body and rotatably carrying the downstream guide.

2. The tooling apparatus of claim 1, wherein the adjustment device includes an incremental adjustment device carried by the housing to incrementally pivot the adjustment member for incremental adjustment of the upstream guide to incrementally adjust a depth of cut of the cutting tool into the weld bead.

3. A tooling apparatus for deburring an internal weld bead from a welded pipe, comprising:
   a housing;
   a cutter and guide assembly carried by the housing in the opening thereof, and including:
      a body;
      a cutting tool carried by the body;
      an upstream guide rotatably carried by the body;
      an adjustment member carried by the body to adjust the upstream guide; and
      a downstream guide rotatably carried by the body; and
   an adjustment device carried by the housing to move the adjustment member for adjustment of the upstream guide to adjust a depth of cut of the cutting tool into the weld bead over a plurality of depths of cut between minimum and maximum depths of cut,
      wherein the adjustment device includes an incremental adjustment device carried by the housing to incrementally pivot the adjustment member for incremental adjustment of the upstream guide to incrementally adjust a depth of cut of the cutting tool into the weld bead, and wherein the incremental adjustment device includes:
a ratchet mechanism coupled to a threaded shaft, and a threaded yoke coupled between the threaded shaft and the adjustment member; and
a solenoid coupled to the ratchet mechanism, wherein the solenoid is activated to actuate the ratchet mechanism, which in turn rotates the threaded shaft to translate the yoke thereby pivoting the adjustment member.

4. A tooling apparatus for deburring an internal weld bead from a welded pipe, comprising:
a housing;
a cutter and guide assembly carried by the housing in the opening thereof, and including:
a body;
a cutting tool carried by the body;
an upstream guide rotatably carried by the body;
an adjustment member carried by the body to adjust the upstream guide; and
a downstream guide rotatably carried by the body; and
an adjustment device carried by the housing to move the adjustment member for adjustment of the upstream guide to adjust a depth of cut of the cutting tool into the weld bead over a plurality of depths of cut between minimum and maximum depths of cut; and
wherein the body includes an upstream guide body that includes at least one aperture carrying an axle shaft, which rotatably carries the upstream guide, wherein the at least one aperture is larger than the axle shaft such that the axle shaft is movable within the aperture for adjustment of the guide.

5. The tooling apparatus of claim 1, wherein the adjustment device includes an infinitely variable adjustment device to move the adjustment member for infinitely variable adjustment of the upstream guide to adjust a depth of cut of the cutting tool into the weld bead.

6. A tooling apparatus for deburring an internal weld bead from a welded pipe, comprising:
a housing;
a cutter and guide assembly carried by the housing in the opening thereof, and including:
a body;
a cutting tool carried by the body;
an upstream guide rotatably carried by the body;
an adjustment member carried by the body to adjust the upstream guide; and
a downstream guide rotatably carried by the body; and
an adjustment device carried by the housing to move the adjustment member for adjustment of the upstream guide to adjust a depth of cut of the cutting tool into the weld bead over a plurality of depths of cut between minimum and maximum depths of cut,
wherein the adjustment device includes an infinitely variable adjustment device to move the adjustment member for infinitely variable adjustment of the upstream guide to adjust a depth of cut of the cutting tool into the weld bead; and
wherein the infinitely variable adjustment device includes:
an upstream guide holder rotatably carrying the upstream guide;
a tapered surface of the adjustment member;
a tapered surface of the upstream guide holder that cooperates with the tapered surface of the adjustment member; and
an actuator coupled to the adjustment member, wherein the actuator is activated to longitudinally translate the adjustment member, which in turn transversely translates the upstream guide holder.

7. The tooling apparatus of claim 1, further comprising:
an adjustment device carried by the housing downstream of the downstream guide body and coupled to the cutting tool to rotate the cutting tool.

8. A tooling apparatus for deburring a weld bead from a welded pipe, comprising:
a housing including upstream and downstream ends, sides, a bottom, a rounded top, and an opening;
a cutter and guide assembly carried by the housing in the opening thereof. and including:
a body;
a cutting tool rotatably carried by the body;
an upstream guide rotatably carried by the body; and
a downstream guide rotatably carried by the body; and
an adjustment device carried by the housing and coupled to the cutting tool to rotate the cutting tool; and
wherein the body includes:
a cutter body rotatably carrying the cutting tool;
an upstream guide body coupled to the cutter body and rotatably carrying the upstream guide; and
a downstream guide body coupled to the cutter body and rotatably carrying the downstream guide.

9. The tooling apparatus of claim 8, wherein the adjustment device includes an incremental adjustment device carried by the housing downstream of the downstream guide body and coupled to the cutting tool to incrementally rotate the cutting tool.

10. A tooling apparatus for deburring a weld bead from a welded pipe, comprising:
a housing;
a cutter and guide assembly carried by the housing and including:
a body;
a cutting tool rotatably carried by the body;
an upstream guide rotatably carried by the body; and
a downstream guide rotatably carried by the body; and
an adjustment device carried by the housing and coupled to the cutting tool to rotate the cutting tool,
wherein the adjustment device includes an incremental adjustment device carried by the housing downstream of the downstream guide body and coupled to the cutting tool to incrementally rotate the cutting tool, and
wherein the incremental adjustment device includes:
a ratchet mechanism coupled to the cutting tool via a driveline including a universal joint; and
a solenoid coupled to the ratchet mechanism, wherein the solenoid is activated to actuate the ratchet mechanism, which in turn rotates the driveline to incrementally rotatably adjust the cutting tool.

11. The tooling apparatus of claim 10, wherein the body includes a cutter body that carries a drive gear coupled to the universal joint, and a driven gear in mesh with the drive gear and coupled to the cutting tool.

12. The tooling apparatus of claim 8, further comprising a scrap chopper including a scrap chopper body and a first set of guide rails carried by the scrap chopper body, wherein the cutter and guide assembly further includes a second set of guide rails that cooperate with the first set of guide rails.

13. A tooling apparatus for deburring a weld bead from a welded pipe, comprising:
   a housing including upstream and downstream ends, sides, a bottom, a rounded top, and an opening;
   a cutter and guide assembly carried by the housing in the opening thereof, and including:
   a body;
   a cutting tool rotatably carried by the body;
   an upstream guide rotatably carried by the body; and
   a downstream guide rotatably carried by the body; and
   an adjustment device carried by the housing and coupled to the cutting tool to rotate the cutting tool; and
   wherein the housing includes an outer surface and a transversely extending open slot in the outer surface, and the cutter and guide assembly further includes an axle shaft extending through the guide and into the open slot in the housing.

14. The tooling apparatus of claim 8, wherein the cutting tool includes an indexable cutter holder and a plurality of cutting tool inserts carried by the cutter holder.

15. The tooling apparatus of claim 8, wherein the adjustment device includes an infinitely variable adjustment device including bevel gears coupled to the cutting tool, a drive shaft coupled to one of the bevel gears, and an actuator that is coupled to the driveshaft and that is energized to infinitely variably rotate the cutting tool.

* * * * *